(12) United States Patent
King

(10) Patent No.: US 6,481,692 B1
(45) Date of Patent: Nov. 19, 2002

(54) WINCH ASSEMBLY

(76) Inventor: Lindsay Alexander King, 168 North Rocks Road, North Rocks, New South Wales 2151 (AU)

( * ) Notice: Subject to any disclaimer, the term of this patent is extended or adjusted under 35 U.S.C. 154(b) by 93 days.

(21) Appl. No.: 09/687,639

(22) Filed: Oct. 13, 2000

(30) Foreign Application Priority Data

Oct. 15, 1999 (AU) .................................................. PQ3454

(51) Int. Cl.[7] .......................... B25B 25/00; A44B 11/25; B65D 63/00
(52) U.S. Cl. .......................... 254/219; 254/223; 24/68; 410/103
(58) Field of Search ................................ 254/342, 219, 254/223; 24/68; 410/104, 103, 100

(56) References Cited

U.S. PATENT DOCUMENTS

| | | | |
|---|---|---|---|
| 4,382,736 A | * 5/1983 | Thomas | 410/104 |
| 4,510,652 A | * 4/1985 | van Iperen | 24/68 |
| 5,156,506 A | * 10/1992 | Bailey | 410/100 |
| 5,295,664 A | * 3/1994 | Kamper | 254/220 |
| 5,466,030 A | * 11/1995 | Harris | 296/141 |
| 5,490,749 A | * 2/1996 | Arbues | 410/103 |
| 5,803,437 A | * 9/1998 | Paterson | 254/343 |
| 6,030,158 A | * 2/2000 | Tatina | 410/100 |
| 2002/0021018 A1 | * 2/2002 | Royer | 296/98 |

* cited by examiner

Primary Examiner—Michael R. Mansen
(74) Attorney, Agent, or Firm—Ladas & Parry

(57) ABSTRACT

A winch assembly (10) including a winch shaft (12) adapted for rotation about a first axis (14) and a substantially right angled drive transferring mechanism (20) having a drive input (24) coupled to a tool engagement device (32) and drive output (26) coupled to the winch shaft (12). The tool engagement device (32) is adapted for rotation about a second axis (34) extending substantially radially from the first axis (14). Rotation of the tool engagement device (32) causes rotation of the winch shaft (12).

8 Claims, 3 Drawing Sheets

WINCH ASSEMBLY

FIELD OF THE INVENTION

The present invention relates to a winch assembly.

The invention has been primarily developed for use in tensioning a load retaining strap for restraining freight or load on vehicles including rigid-bodied trucks, semi-trailers, flat-deck trailers, drop-deck trailers, car carriers and logging trailers and will be described with reference to these applications. However, it will be appreciated that the invention is not limited to these particular applications.

BACKGROUND OF THE INVENTION

The use of winches in applying tension to load retaining straps in the transport industry is well known, Known winches include a winch shaft mounted for rotation in a bracket that can be attached to, for example, a semi trailer. Cylindrical extensions coupled to respective ends of the winch shaft are provided on either side of the bracket. The extensions include a radial aperture through which a drive bar or pole may be inserted to rotate the extension and thus the winch shaft.

The rotational axis of the winch shaft is generally substantially parallel to the longitudinal axis of the trailer and the cylindrical extension and the bar rotate about that axis. In recent times, it has become necessary to mount additional components to the trailers, for example mud guards. These components greatly restrict access to the cylindrical extension at certain locations along the length of the trailer and can make rotation by the bar or pole difficult or impossible.

It is an object of the present invention to substantially overcome or at least ameliorate this deficiency

SUMMARY OF THE INVENTION

Accordingly, the present invention provides a winch assembly including:

a winch shaft adapted for rotation about a first axis; and a substantially right angled drive transferring mechanism having a drive input coupled to a tool engagement device and drive output coupled to the winch shaft, the tool engagement device adapted for rotation about a second axis extending substantially radially from the first axis, wherein rotation of the tool engagement device causes rotation of the winch shaft.

The tool engagement device is preferably a nut, most preferably a nut of common size to those used in attaching road wheels to a vehicle or vehicle trailer.

The assembly desirably includes a mounting bracket. In one form, the bracket is adapted to be slidably received within complimentary mounting formations on a vehicle or vehicle trailer. In another form, the bracket is attached directly to the vehicle a vehicle trailer, for example by welding.

The drive transferring mechanism is preferably contained in a housing. In one form, the housing is fixed relative to the mounting bracket. In another form, the housing is rotatable about the first axis relative to the bracket.

The housing is desirably positioned adjacent one end of the winch shaft and a cylindrical extension with a radial aperture therethrough is desirably positioned adjacent the other end of the winch shaft.

The drive transferring apparatus preferably includes a relatively small gear coupled to the tool engagement device that meshes with a relatively large gear coupled to the winch shaft. The gears are preferably helical bevel gears.

The winch shaft preferably includes means for engaging a load retaining strap, most preferably in the form of a slot.

BRIEF DESCRIPTION OF THE DRAWINGS

Preferred embodiments of the invention will now be described, by way of examples only, with reference to the accompanying drawings in which.

DETAILED DESCRIPTION OF THE PREFERRED EMBODIMENTS

Figure 1:
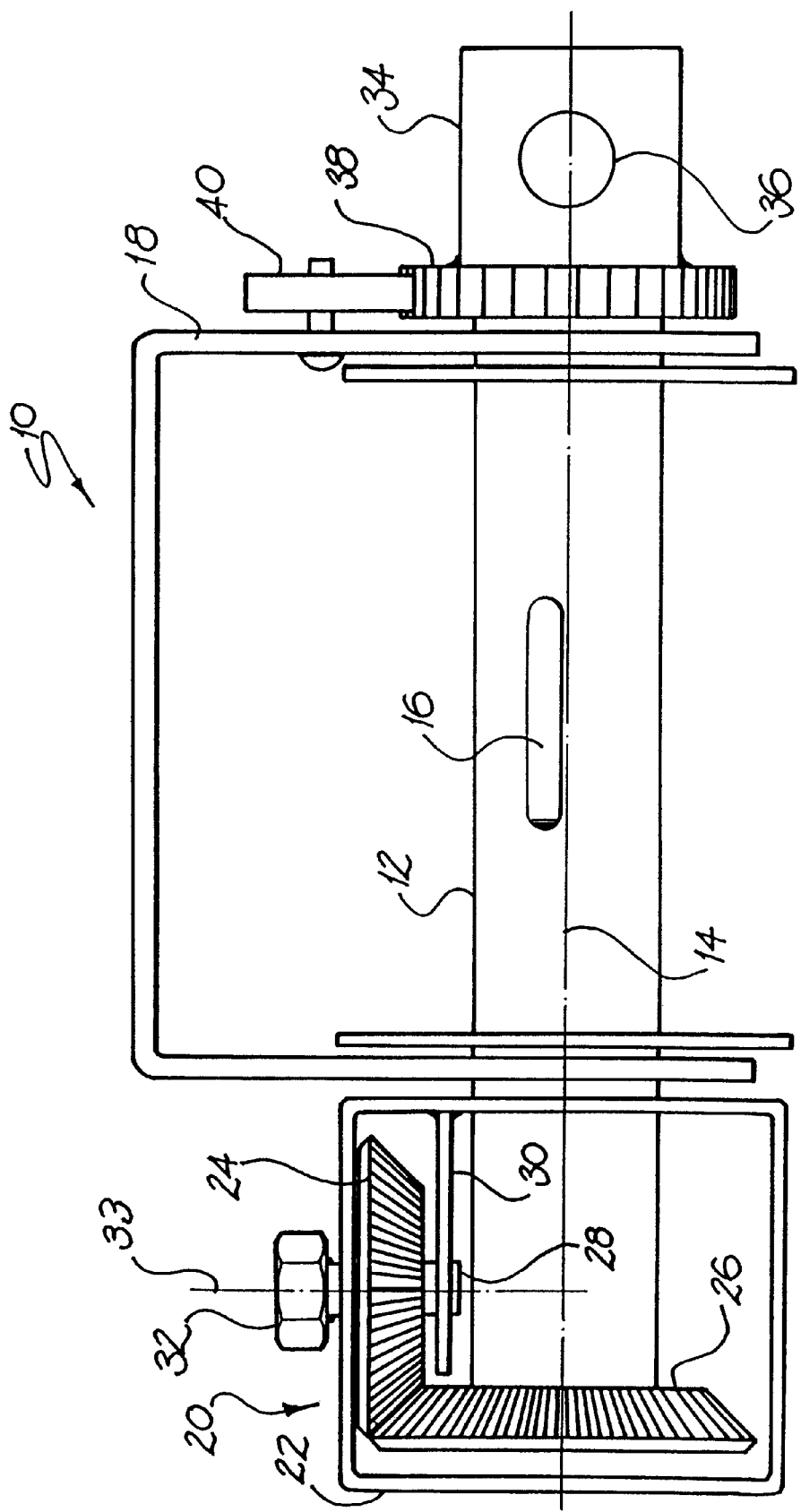
FIG. 1. is a schematic side view of a winch assembly according to a first embodiment of the invention.

Referring to FIG. 1, there is shown a first embodiment of a winch assembly 10 in accordance with the present invention. The assembly includes a winch shaft 12 which is adapted for rotation about a first axis 14. The shaft 12 includes a slot 16 for engagement with a load retaining strap (not shown), as is well known in the art. The shaft 12 is rotatably mounted within a bracket 18. The bracket 18 can be adapted to slidably engage winch track rails provided on, for example, a semi trailer. Alternatively, the bracket 18 can be attached directly to the trailer, for example, by welding.

A right angled drive transferring mechanism, indicated generally by the reference numeral 20, is mounted external to the bracket 18 adjacent one end of the shaft 12. In this embodiment, the drive transferring mechanism 20 is contained within a housing 22 and the housing 22 is adapted to rotate about the axis 14 relative to the bracket 18 for convenient positioning of the drive nut 32 by the operator. However, in other embodiments (not shown), the position of the housing 22 may be fixed relative to the bracket 18. The housing 22 contains a relatively small input drive gear 24 positioned in meshing engagement with a relatively large output drive gear 76. The input drive gear 24 is non-rotatably mounted on an input shaft 28 located by a shaft mounting plate 30. A tool engagement device, in the form of nut 32, is also non-rotatably mounted on the shaft 28 external the housing 22. The nut 32, shaft 28 and gear 24 are adapted for rotation about axis 33 which extends radially from the axis 14.

The output gear 26 is non-rotatably mounted directly to one end of the shaft 12. A cylindrical extension 34 with a radial aperture 36 therein is non-rotatably mounted to the shaft 12 adjacent the other end of the shaft 12. A toothed locking wheel 38 is non-rotatably mounted to the extension 34 for engagement with a ratchet locking member 40 Engaging the locking member 40 with the gear 38 locks the shaft 12 at a predetermined position, as is well known in the art.

Figure 3:
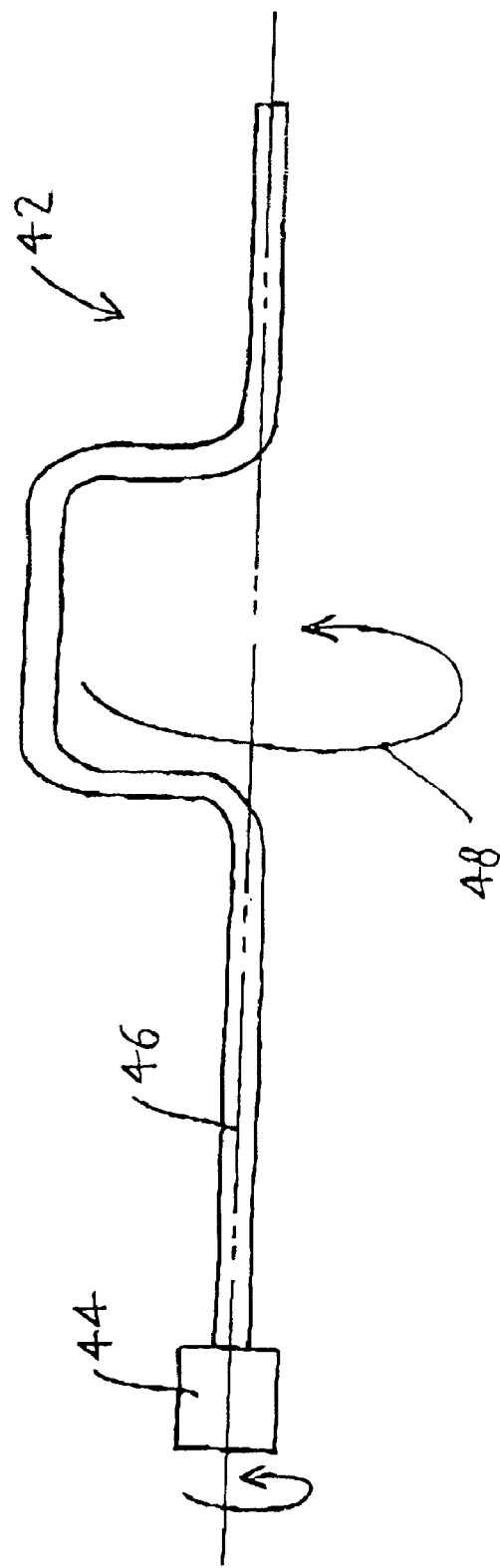
FIG. 3 is a schematic side view of a tool suitable for use with the winch assemblies shown in FIGS. 1 and 2.

FIG. 3 shows a tool 42 having a socket 44 which is adapted to engage the nut 32. Rotating the tool 42 about its longitudinal axis 46 in the manner indicated by arrow 48 causes rotation of the nut 32 and the input gear 24 and corresponding rotation of the output gear 26 and the shaft 12.

Figure 2:
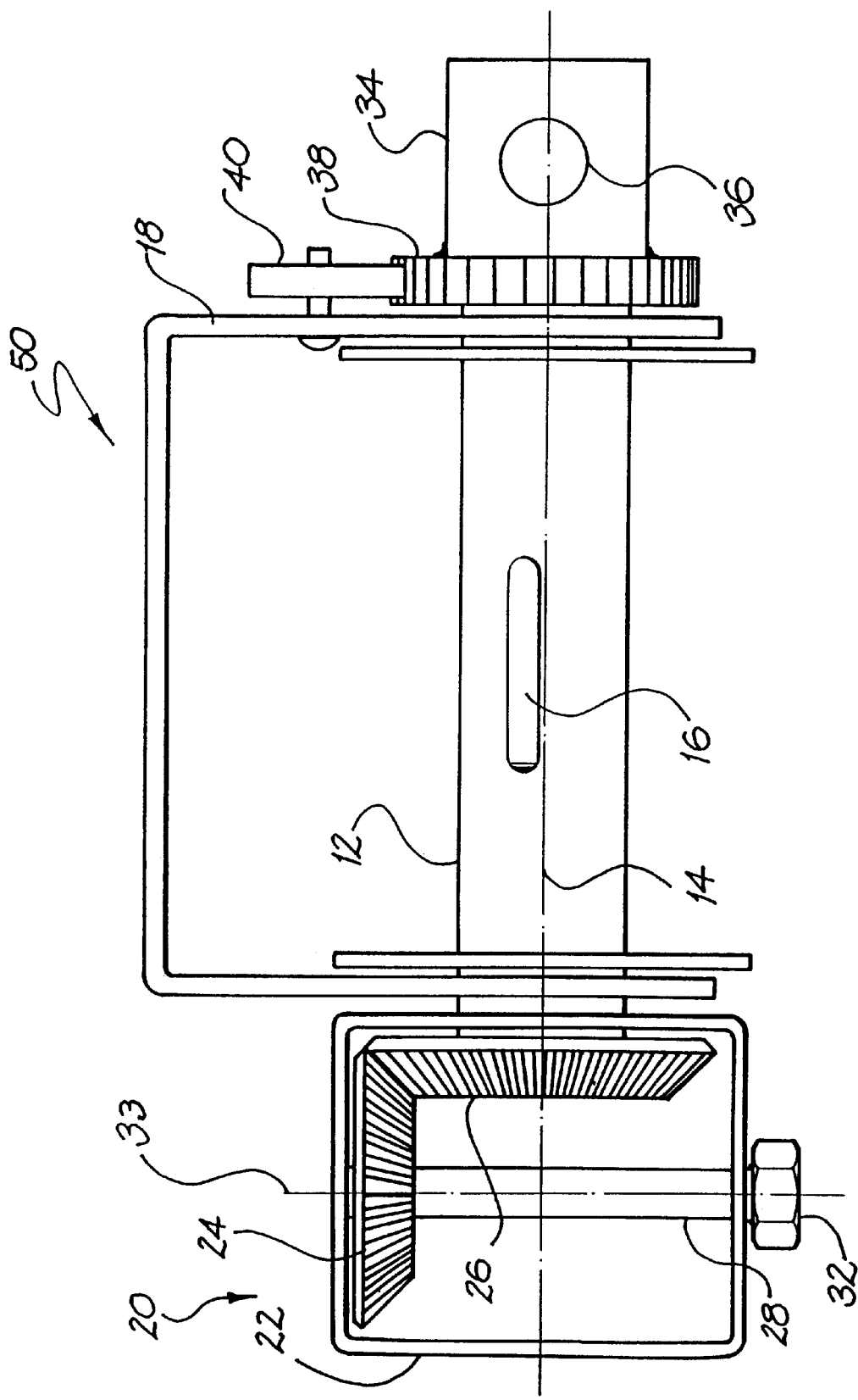
FIG. 2 is a schematic side view of the winch assembly according to a second embodiment of the invention.

FIG. 2 shows a second embodiment of a winch assembly 50 in which like reference numerals have been used to indicate like features relative to the first embodiment. The assembly 50 is essentially the same as the assembly 10 except the positions of the input and output gears 24 and 26 have been reversed within the housing 22 which obviates the need for the mounting plate 30.

The primary advantage of the invention is that it can be mounted within confined spaces as only access to the nut in the direction of its rotational axis is required. Additionally, the gear reduction provided by the drive transfering mechanism requires less effort on behalf of the operator to achieve a desired strap tension. This results in improved load security, faster operation and reduces the likelihood of operator injury. Further, as the tool rotates about its longitudinal axis, there is less a likelihood that it will contact or damage the trailer or any of its accessories, as was often the case with the drive bar of prior art winches. Also, as the nut is preferably the same size as the wheel nuts of the vehicle itself, then the winch can conveniently be operated to the vehicle's wheel brace if the tool is lost. Finally, the cylindrical extension allows the winches according to the invention to be operated in the manner of prior art winches if the tool and wheel brace are lost, or the drive transferring mechanism is damaged or the operator is unfamiliar with the operation of the winch according to the invention.

Although the invention has been described with reference to specific examples, it will be appreciated by those skilled in the art, that the invention may be embodied in many other forms.

I claim:

1. A winch assembly including:
   a mounting bracket;
   a winch shaft adapted for rotation about a first axis; and
   a substantially right angled drive transferring mechanism contained in a housing, the housing being rotatable about the first axis relative to the bracket, the drive transferring mechanism having a drive input coupled to a tool engagement device and drive output coupled to the winch shaft, the tool engagement device adapted for rotation about a second axis extending substantially radially from the first axis, wherein rotation of the tool engagement device causes rotation of the winch shaft.

2. The winch assembly as claimed in claim 1, wherein the tool engagement device is a nut.

3. The winch assembly as claimed in claim 1, wherein the bracket is adapted to be slidably received within complementary mounting formations on a vehicle or vehicle trailer.

4. The winch assembly as claimed in claim 1, wherein the bracket is attached directly to a vehicle or vehicle trailer.

5. The winch assembly as claimed in claim 4, wherein the bracket is attached directly to the vehicle or vehicle trailer by welding.

6. The winch assembly as claimed in claim 1, wherein the housing is positioned adjacent one end of the winch shaft and a cylindrical extension with a radial aperture therethrough is positioned adjacent the other end of the winch shaft.

7. The winch assembly as claimed in claim 1, wherein the drive transferring mechanism includes a relatively small gear coupled to the tool engagement device that meshes with a relatively large gear coupled to the winch shaft.

8. The winch assembly as claimed in claim 1, wherein the winch shaft includes means for engaging a load retaining strap.

* * * * *